United States Patent
Li

(10) Patent No.: US 7,319,867 B2
(45) Date of Patent: Jan. 15, 2008

(54) METHOD AND APPARATUS FOR WAKE ON WIRELESS SYSTEMS

(75) Inventor: Sheung L. Li, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 129 days.

(21) Appl. No.: 10/924,706

(22) Filed: Aug. 23, 2004

(65) Prior Publication Data

US 2005/0059386 A1   Mar. 17, 2005

Related U.S. Application Data

(60) Provisional application No. 60/503,314, filed on Sep. 15, 2003.

(51) Int. Cl.
*H04M 3/00* (2006.01)
*H04M 1/00* (2006.01)
*H04Q 7/27* (2006.01)
*H04B 1/38* (2006.01)

(52) U.S. Cl. ............... 455/420; 455/574; 370/328; 370/338

(58) Field of Classification Search ............ 455/554.1, 455/420, 574; 370/346, 328, 338; 709/230, 709/237; 713/300; 342/357.13
See application file for complete search history.

(56) References Cited

U.S. PATENT DOCUMENTS

| | | | |
|---|---|---|---|
| 2002/0147823 A1* | 10/2002 | Healy | 709/230 |
| 2004/0038707 A1* | 2/2004 | Kim | 455/554.1 |
| 2004/0078480 A1* | 4/2004 | Boucher et al. | 709/237 |
| 2004/0081133 A1* | 4/2004 | Smavatkul et al. | 370/346 |
| 2004/0120278 A1* | 6/2004 | Krantz et al. | 370/328 |
| 2004/0153676 A1* | 8/2004 | Krantz et al. | 713/300 |
| 2005/0219120 A1* | 10/2005 | Chang | 342/357.13 |

* cited by examiner

*Primary Examiner*—Jean Gelin
*Assistant Examiner*—Michael Vu
(74) *Attorney, Agent, or Firm*—Bever, Hoffman & Harms, LLP; Jeanette S. Harms

(57) ABSTRACT

A method and apparatus to wirelessly control network devices is described. In one embodiment, a wireless device is used to control at least one host device using a network. In one aspect, a wireless device receives and determines a response to network control signals received thereto. In another aspect, a wireless device controls a host sleep sequence to allow a network to remotely power a host device between an active and passive state. In one aspect, a wireless device provides one or more network identification responses to signals received from the network. In another aspect, a network provides an alert to a third party such as a network administrator if the network determines a wireless device is absent from the network due to a loss of signal therefrom.

4 Claims, 5 Drawing Sheets

METHOD AND APPARATUS FOR WAKE ON WIRELESS SYSTEMS

RELATED APPLICATIONS

This application claims priority of U.S. Provisional Patent Application 60/503,314, entitled "Method And Apparatus For Wake On Wireless Systems" filed Sep. 15, 2003.

BACKGROUND OF THE INVENTION

1. Field of the Invention

Embodiments of the present invention generally relate to communication devices and more specifically to receiving and transmitting signals between communication devices for wireless remote operations.

2. Description of the Related Art

Generally, a communication system includes a transmitter and receiver, which respectively transmit and receive information signals over a transmission media such as wires, aether or atmosphere. When aether or atmosphere are used, the transmission is commonly referred to as "wireless communication." Examples of various types of wireless communication systems include digital cellular, packet data paging, wireless local area networks (WLAN), wireless wide area networks (WWAN), personal communication systems, and others.

One challenge of wireless communication relates to the ability to remotely control the operation of wireless network systems. Conventionally, network software has been developed for remote control of wired local area networks (LAN) and wide area networks (WAN). Some versions of such software have been developed for specific wakeup operations so that for example, a network administrator may be able to turn on one or more computer systems remotely across the wired network if the remote system is connected. Other applications of such network software are used to remotely operate other devices such as laptop computers, cash registers, ATM machines, and others. One such software is known as Wake-on-LAN®, which was developed by International Business Machines (IBM) Corp (Armonk, N.Y.) and Intel Corporation (Santa Clara, Calif.). Unfortunately, hardwired LAN systems require each user of the network to be physically connected to the network through, for example, cables connected to an Ethernet switch. Usually, as wired networks are physically connected together, they are limited by wire placement. Thus, hardwired LAN systems are generally inflexible with regard to network terminal mobility.

Due to the nature of wireless networks, wireless network systems are usually more flexible with regard to user mobility. However, to maintain mobility, wired systems are also required to connect to the network through access points. Therefore, a user may move within a wireless boundary defined by the wireless transmission range without regard to what access point is being used. Unfortunately, controlling hosts (wireless devices) roaming about a wireless network requires that the host machine be on and in direct communication with the network on a continuous basis which may consume a great deal of power.

Conventionally in wired networks, if the host were disconnected, then it would be off the network. Moreover, the disconnection would be subject to measurement and characterization (e.g., carrier loss, time domain reflectometry (TDR)). However, it is often difficult to ascertain why the host is off the wireless network. For example, the host may be off the network because the user of the host is wandering in and out of range of the network, the host has been powered down or placed in a sleep mode, or may be the result of the host being taken to another location outside the range of the wireless network.

Therefore, what is needed is a method and apparatus to wirelessly control operations of devices associated with a wireless network. In addition, it would be desirable to know the network status of the device on the wireless network even when the device is powered down.

SUMMARY OF THE INVENTION

A first aspect of the present invention is a wireless network having at least one network transceiver, at least one host transceiver configured to communicate with the network transceiver, and a remote control circuit coupled to the host transceiver and responsive to network signals from the at least one network transceiver.

Another aspect of the present invention is a method of wirelessly controlling one or more devices wirelessly coupled to a network. The method includes wirelessly providing network control signals to at least one wireless network device, and the at least one network device performing at least one operation in response to at least one of the network control signals.

Another aspect of the present invention is a wireless network device. The wireless network device includes at least one network device wirelessly coupled to a network controller. The wireless network device includes a data repository containing (i) a plurality of host commands and (ii) comparison data associated with the plurality of host commands, a command program, and a processor configured to execute the command program configured to perform at least some of the plurality of host commands in response to network signals associated with the comparison data.

Still another aspect of the present invention is a method of wirelessly controlling network devices. The method includes receiving control signals at least at one of the network devices, comparing the control signals to comparison data, and if at least some of the comparison data matches within a predefined threshold of the at least some of the control signals, then performing with the network device at least one network operation associated with at least one of the matching control signals.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE DRAWINGS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Aspects of the present invention are described in terms of wireless communication systems such as defined in the IEEE 802.11 family of standards, and networks such as Wireless Local Area Network (WLAN), WWAN, and other networks utilizing data packet communication such as the Internet. However, it is understood the present invention is not limited to any particular communication system or network environment.

As will be described below, aspects of one embodiment pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

Figure 1:
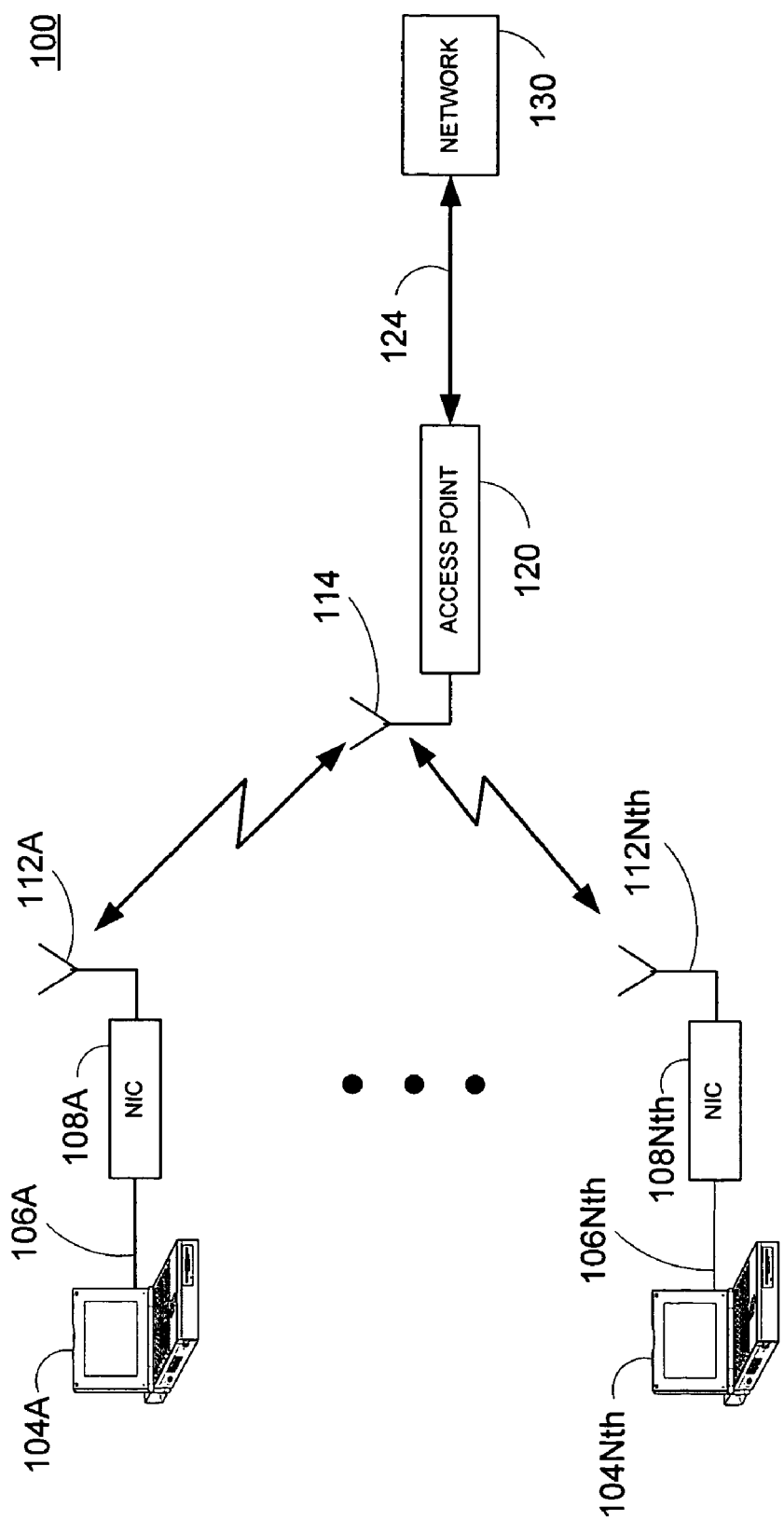
FIG. 1 is a high-level schematic of one embodiment of a wireless network in accordance with aspects of the invention.

FIG. 1 is a high-level schematic of one embodiment of a wireless network 100 in accordance with aspects of the invention. Wireless network 100 includes a plurality of host devices 104A-N, where Nth defines an "N" number of host devices 104A-N. Each host device 104A-N is connected to a wireless network device, e.g. Network Interface Card (NIC) 108A-N. NIC cards 108A-N include a respective antenna 112A-N configured to wirelessly connect each NIC card 108A-N to at least one access point 120. Access point 120 is coupled to an access point antenna 114 configured to receive Radio Frequency (RF) signals from NIC cards 108A-N. Access point 120 is connected via network signal 124 to network 130, such as a network hub, for communication therewith. Network signal 124 may be of virtually any type including wired connection, wireless connection, and the like. Network commands are wirelessly transmitted to and from NIC cards 108A-N. In one aspect of the invention described further below, NIC cards 108A-N may transmit at least one network signal to network 130 indicative of NIC cards 108A-N and host 104A-being present on network 130.

In one case, such a network signal may be periodic, e.g., a "heartbeat:" a transmission intended to indicate presence. In another aspect of the present invention, NIC cards 108A-N receive host command signals from network 130 to control at least one operation of host 104A-N, examples of which are described below.

Figure 2:
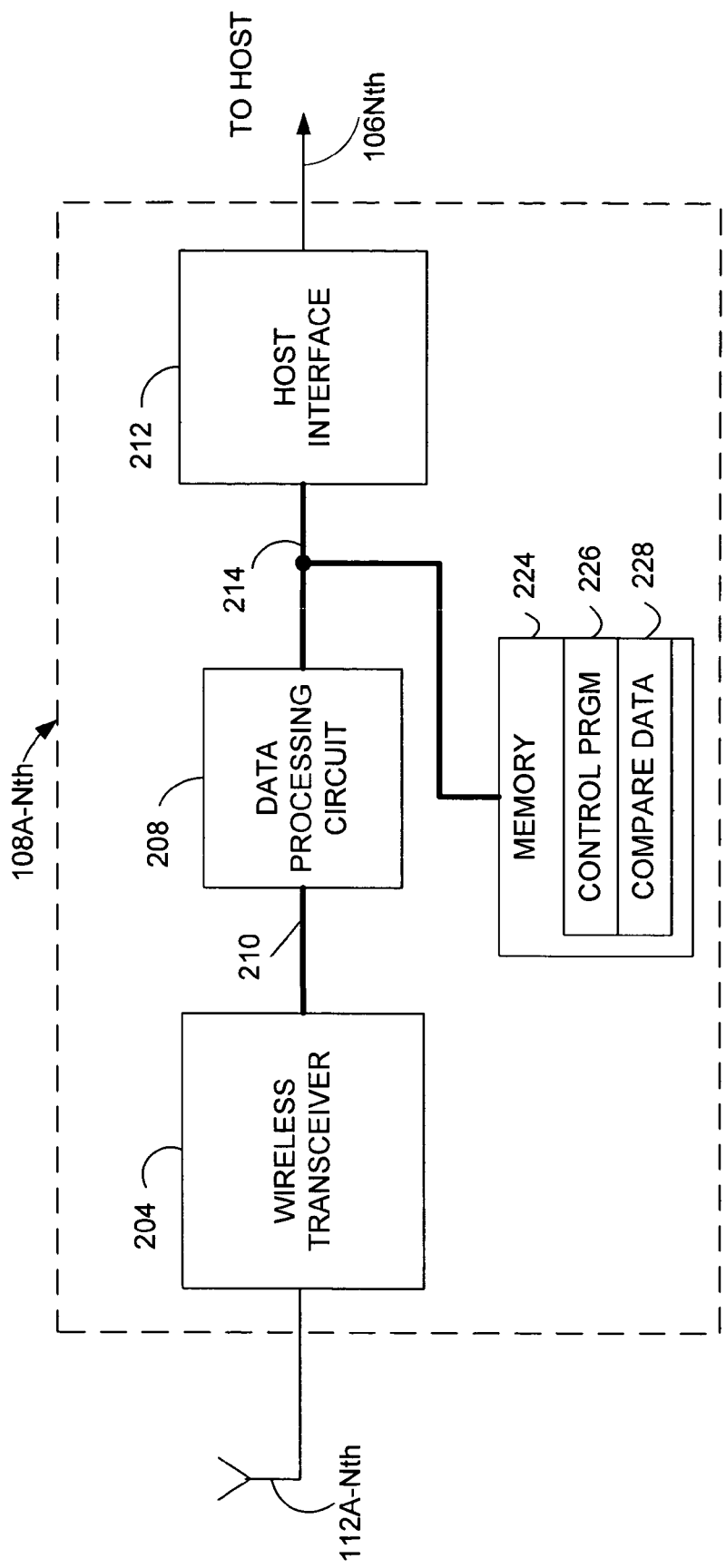
FIG. 2 is a high-level schematic of one embodiment of a wireless network interface card in accordance with aspects of the invention.

FIG. 2 is a high-level schematic of one embodiment of a wireless NIC card 108A-N in accordance with aspects of the invention. NIC card 108A-N includes wireless transceiver 204 connected to and responsive to wireless signals received via antenna 112A-N as is known. For purposes of clarity, circuits of NIC cards are described in terms of hardware devices such as registers, data processing circuits, and the like. However it is understood that aspects of the present invention may be implemented in a plurality of ways such as using a logic implementation, for example. 108A-N Wireless transceiver 204 may be connected to data processing circuit 208 via bus 210. Data processing circuit 208 may include a variety of processing circuits such as a Central Processing Unit (CPU) or a fixed logic implementation.

Data processing circuit 208 is coupled to host interface 212 via bus 214. Host interface 212 is configured to communicate with host 104A-N via respective network connection 106A-N. Illustratively, data processing circuit 208 is coupled to memory 224 via bus 214. In one embodiment, memory 224 may be resident on host 104A-N and coupled via host interface 212. Memory 224 is preferably random access memory sufficiently large to hold the necessary programming and data structures located on any one of NIC cards 108A-N. While memory 224 is shown as a single entity, it should be understood that memory 224 may in fact comprise a plurality of modules, and that memory 224 may exist at multiple levels, from high speed registers and caches to lower speed but larger DRAM chips.

Illustratively, memory 224 may include control program 226 that, when executed on data processing circuit 208, may determine at least one control operation of host 104A-N (see FIG. 1) in response to network control signals. Control program 226 may also be configured to determine one or more network responses to transmit from its NIC card 108A-N via wireless transceiver 204 to network 130 in response to network signals. Control program 226 may use any one of a number of different programming languages. For example, the program code can be written in PLC code (e.g., ladder logic), a higher-level language such as C, C++, Java, or a number of other languages. While the control program 226 may be a standalone program, it is contemplated that control program 226 may be combined with other programs. For example, the control program 226 may be combined with other device programs configured to provide operational control to host 104A-N and communicate with network 130.

In one embodiment, memory 224 includes stored comparison data 228 representative of a plurality of comparison data such as digital data frame patterns. In one aspect of the present invention, control program 226 is configured to compare a plurality of comparison data 228 with network signal data to determine one or more responses associated therewith. For example, if a data frame pattern is associated with a comparison data for waking a host 104A-N up from a sleep mode, such control program 226 may issue commands to host 104A-N through host interface 212 to wake up.

Thus, in this embodiment, NIC cards 108A-N may be set to communicate with host 104A-N and network 130 via at least one access point 130. NIC cards 108A-N may receive a variety of network signals, network commands, and the like. NIC cards 108A-N may compare such signals to associated responses and perform one or more network operations associated therewith such as wake up host 104A-N in a sleep mode or send a network signal indicating that NIC card 108A-N is on network 130.

Figure 3:
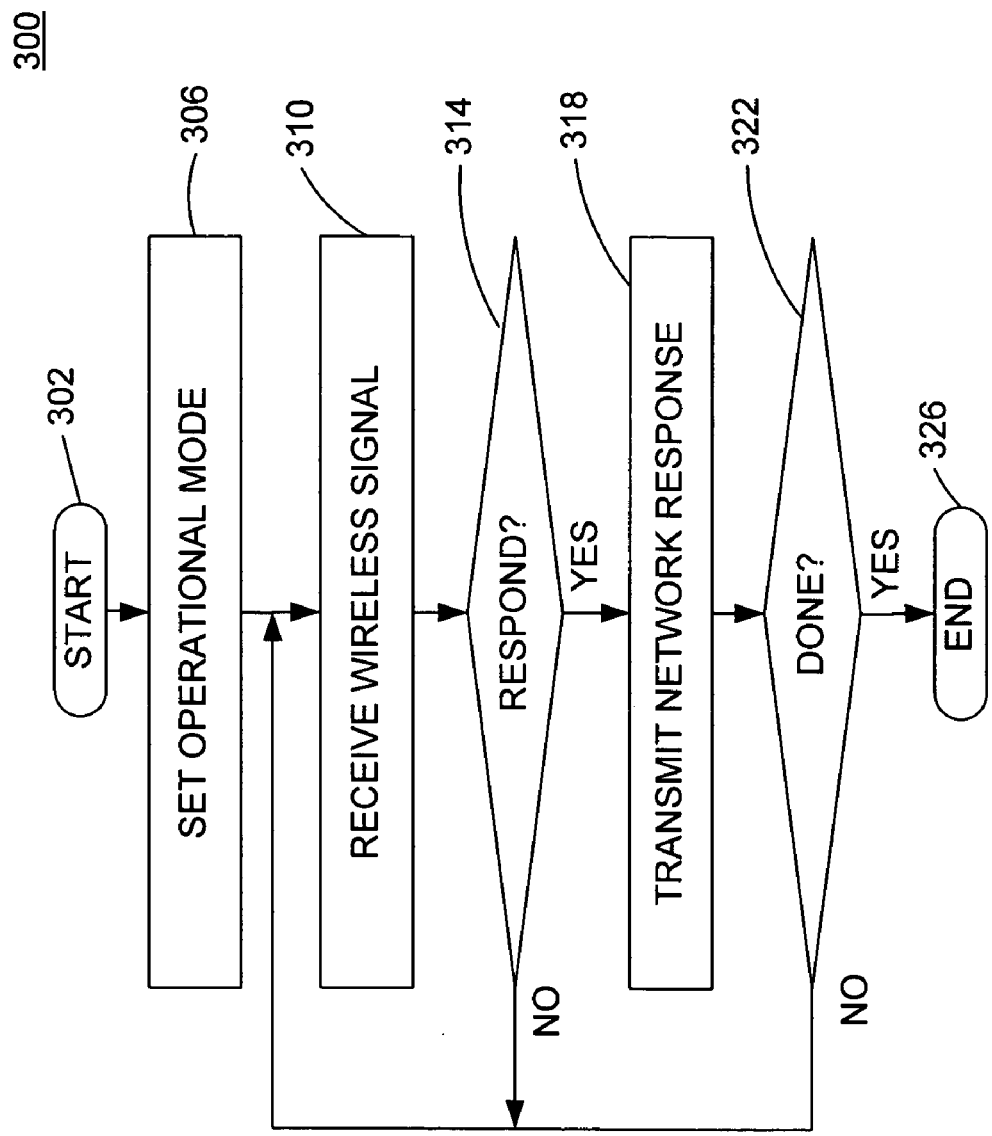
FIG. 3 is a flow diagram of one embodiment of a method of wirelessly maintaining a network device on a wireless network.

FIG. 3 is a flow diagram of one embodiment of a method 300 of wirelessly maintaining a network device on a wireless network 130. Start step 302 is entered into when, for example, command program 226 is activated. At step 306, one or more operational modes are set. For example, an operational mode may be to configure a host 104A-N during a sleep mode to wake up when at least one wake up command is received from network 130. In another example, an operational mode may be to set a main power source (such as VCC) for wireless network devices to an alternate power source such as a battery, auxiliary bus power, and the like. This may be especially useful when, during a host sleep mode, auxiliary power used by such a host 108A-N is made available to a respective NIC card 108A-N to conserve power. In another aspect, an operation mode may set on NIC card 108A-N to transmit a series of signals to indicate that NIC card 108A-N is wirelessly connected to network 130. For example, consider a case where NIC card 108A-N has been configured by command program 226 to transmit a signal, e.g., a "keep alive" or "heartbeat" signal, in response to every Nth beacon received from access point 120, such as a data frame, indicative that NIC card 108A-N is connected to network 130. Thus, when an Nth beacon is received, NIC card 108A-N may transmit such a keep alive signal. In another example, NIC card 108A-N may transmit such a keep alive signal in response to a local access point 130 sending a specified data element such as a TIM bit. A TIM bit is herein defined as a signal indicating that network 130 has data available for one or more hosts 108A-N. This TIM bit may be especially useful when network devices, such as switches, may "time-out" and thereby internally mark as unavailable an inactive host, e.g., NIC card 108A-N, after a predetermined period.

At step 310, NIC card 108A-N may receive a wireless signal such as a beacon from network 130. At step 314, a response, if any, is determined. If no response is required, then method 300 proceeds to 310. If a response is required, then at step 318 at least one response is performed. In one aspect of the present invention, at least one response may be determined by comparing one or more digital patterns to those stored, for example, in compare data 228. Patterns may include a variety of different data types and parameters such as digital data.

In one embodiment, patterns correspond to a digital pattern byte consisting of at lease two subparts, a pattern mask, and a pattern byte value. In one operational case, the pattern byte mask determines whether at least one pattern byte must match a byte in least one incoming frame, a byte in at least one incoming frame matches any pattern byte value or indicates that remaining bytes, if any, of at least one incoming frame are considered matched, thus effectively marking an end-of-frame.

Table 1 provides one illustrative example of such a digital pattern and associated values that may be stored as comparison data 258. For example, method 300 may be configured to match twenty-four bytes of a received frame header (regardless of data in that header), the header including thirty-six bytes and compare at least some of a remaining byte values to stored commands associated therewith.

TABLE 1

| Pattern Byte No. | Pattern Byte Mask | Pattern Byte Value | Comments |
|---|---|---|---|
| 0 | 2 | N/A | IGNORE HEADER |
| 1 | 2 | N/A | IGNORE HEADER |
| 2-22 | 2 | N/A | IGNORE HEADER |
| 23 | 1 | 0X12 | COMPARE FRAME |
| 24 | 1 | 0X13 | COMPARE FRAME |
| 25 | 1 | 0X14 | COMPARE FRAME |
| 26 | 1 | 0X15 | COMPARE FRAME |
| 27 | 1 | 0X16 | COMPARE FRAME |
| 28 | 1 | 0X17 | COMPARE FRAME |
| 29 | 1 | 0X18 | COMPARE FRAME |
| 30 | 1 | N/A | COMPARE FRAME |
| 31 | 1 | N/A | COMPARE FRAME |
| 32 | 2 | N/A | IGNORE FCS |
| 33 | 2 | N/A | IGNORE ECS |
| 34 | 2 | N/A | IGNORE FCS |
| 35 | 2 | N/A | IGNORE ECS |
| 36 | 3 | N/A | END FRAME |
| 37 | 3 | N/A | END FRAME |
| 38-254 | 3 | N/A | END FRAME |
| 255 | 3 | N/A | END FRAME |

Where, in one example, a pattern byte mask number of: "1" means a byte to match the pattern byte value; "2" means a byte should be within a frame and may not necessarily match a pattern byte value; and "3" means a byte should be outside an incoming frame and ignore a pattern byte value. Table 2 illustrates another example of comparison data 258 such as a data frame that can be of virtually any length as long as predetermined initial byte values includes a specific pattern byte values, e.g., (0x11 0x12 0x13 0x14 0x15 0x16 0x17 0x18) in sequence.

TABLE 2

| Pattern Byte No. | Pattern Byte Mask | Pattern Byte Value | Comments |
|---|---|---|---|
| 0 | 2 | N/A | IGNORE HEADER |
| 1 | 2 | N/A | IGNORE HEADER |
| 2-22 | 2 | N/A | IGNORE HEADER |
| 23 | 1 | N/A | IGNORE HEADER |
| 24 | 1 | 0X11 | COMPARE FRAME |
| 25 | 1 | 0X12 | COMPARE FRAME |
| 26 | 1 | 0X13 | COMPARE FRAME |
| 27 | 1 | 0X14 | COMPARE FRAME |
| 28 | 1 | 0X15 | COMPARE FRAME |
| 29 | 1 | 0X16 | COMPARE FRAME |
| 30 | 1 | 0X17 | COMPARE FRAME |
| 31 | 1 | 0X18 | COMPARE FRAME |
| 32 | 2 | N/A | IGNORE FCS/BODY |
| 33 | 2 | N/A | IGNORE FCS/BODY |
| 34 | 2 | N/A | IGNORE ECS/BODY |
| 35 | 2 | N/A | IGNORE FCS/BODY |
| 36 | 3 | N/A | DO NOT CARE |
| 37 | 3 | N/A | DO NOT CARE |
| 38-254 | 3 | N/A | DO NOT CARE |
| 255 | 3 | N/A | DO NOT CARE |

Returning to FIG. 3, step 322 determines if method 300 is finished, e.g., when NIC card 108A-N operations have been completed. If method 300 is not finished, then the process returns to 310. If method 300 is finished, then step 326 ends network device processing.

Figure 4:
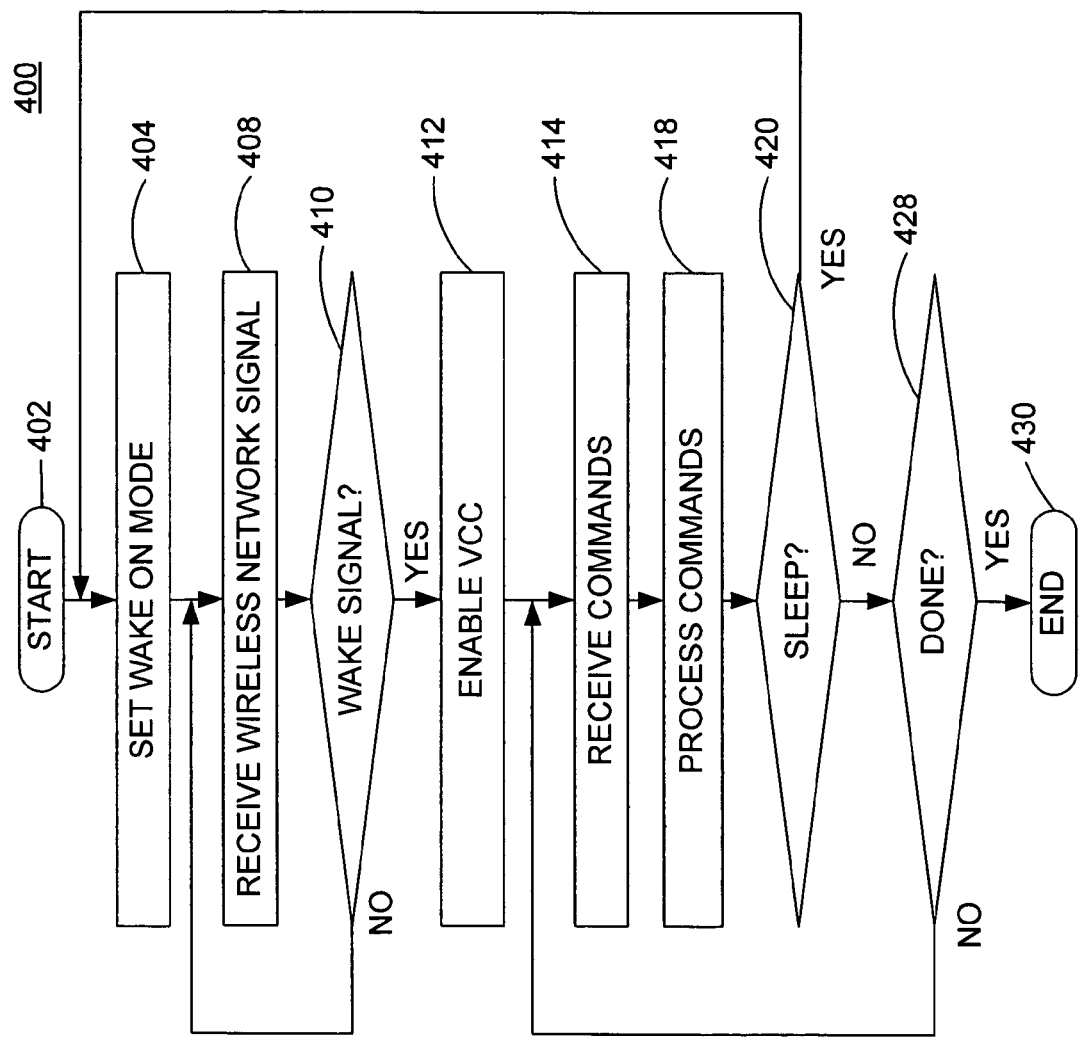
FIG. 4 is a flow diagram of one embodiment of a method of wirelessly controlling a network device using a wireless network.

FIG. 4 is a flow diagram of one embodiment of a method 400 of wirelessly controlling a network device using a wireless network 130. Step 402 is entered into when, for example, command program 226 is activated. At step 404, a "wake on" mode is configured. For example, one or more NIC card 108A-N may be configured such that a host wake up command is issued when a network command signal associated with waking up a sleeping host 104A-N is received by a respective NIC card 108A-N.

At step 408, network signals are received. At step 410, at least one comparison is made between at least some of such network signals to associated network operational commands. If at step 410, such comparisons determine that at least one wake up host command was received, then method 400 proceeds to step 412 to enable a main power supply for host 104A-N and associated NIC card 108A-N. At step 414, one or more hosts 104A-N may receive network commands to process. At step 418, such one or more hosts 104A-N can process such network commands.

Step 420 determines if at least one host sleep command was received. In one aspect, such a command may have been generated over the network 130 (FIG. 1) or by an expiration of a timer (not shown) or program process resident on hosts 104A-N, for example. If at least one host sleep command was received, then host 104A-N is put to sleep and the process returns to step 404. If at least one host sleep command was not received, then step 428 determines if further commands require processing. For example, on wakeup, a number of different command/process pairs (including, as shown in 300, transmitting one or more responses) may be desired. Note that one aspect of a command may be to indicate that it is the last command, i.e. no further processing is required. If command processing is not complete, then the process returns to step 414. If command processing is complete, then step 430 ends control of the network device.

Figure 5:
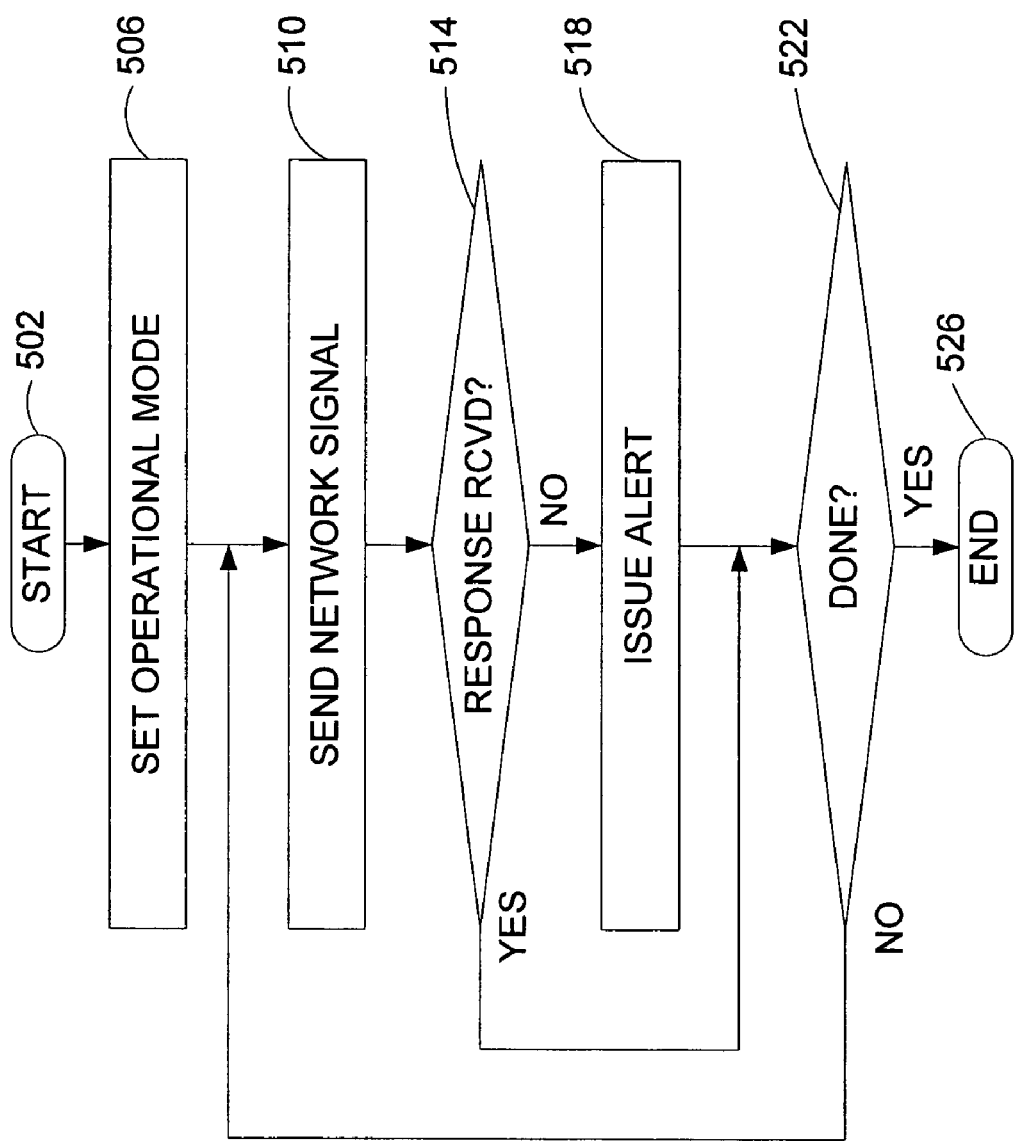
FIG. 5 is a flow diagram of one embodiment of a method of wirelessly detecting if a network device is absent from a wireless network.

FIG. 5 is a flow diagram of one embodiment of a method 500 of wirelessly detecting if a network device is absent from a wireless network 130. Step 502 is entered into when, for example, command program 226 (FIG. 2) is activated. At step 506, one or more operational modes are established for hosts 104A-N using network signals. For example, an operational mode may be used to configure a host 104A-N during sleep to wake up when at least one wake up command is received from network 130 (FIG. 1). In another aspect, an operation mode may be to configure NIC cards 108A-N to reply in a network loop mode to at least some network signals from network 130. In such a network loop mode, network 130 may be configured to detect a reply from one or more NIC cards 108A-N to close a response loop therebetween. In another aspect of the present invention, operational modes may include configuring at least one NIC card 108A-N in a host loop mode to send out a network signal periodically to network 130 without a need for a beacon from network 130.

At step 510, in network loop mode, network 130 transmits a network signal to NIC cards 108A-N. Step 514 determines if network 130 has received at least one reply signal from NIC cards 108A-N. In a network loop mode, such a response may be expected, for example, after a number, N, of beacons or a specific type of transmission has been transmitted from network 130. Such a network loop mode may be useful if a network administrator needs to be alerted when a host 104A-N is disconnected from network 130 after a predetermined time limit configured by such a network administrator, for example.

Alternatively, at step 510, host loop may be employed. The host loop method may be useful in situations were a host 104A-N is placed in a highly theft prone area and a user of such a host 104A-N may want to let a network administrator know host location status.

In either mode, if network 130 not has received at least one reply signal, then step 518 can provide one or more alerts to network 130 indicating that a host 104A-N is absent, i.e. off the network. In another aspect, in either a network loop mode or host loop mode, if host 104A-N is determined to be off network 130, such host 104A-N may perform one or more data disabling processes to prevent access thereto. If the process is done (i.e. a terminating send/receive pair occurs) as determined in step 522, then method 500 ends. Otherwise, the process returns to step 510.

While the foregoing is directed to embodiments of the present invention, other and further embodiments of the invention may be devised without departing from the basic scope thereof, and the scope thereof is determined by the claims that follow.

The invention claimed is:

1. A method of wirelessly maintaining a network interface card (NIC) on a wireless network, the NIC providing a communication interface between a host and the wireless network, the method comprising:
  setting an NIC connection notice mode, a host sleep mode, and an NIC power mode,
  wherein setting the NIC connection notice mode includes configuring the NIC to periodically transmit a "keep alive" signal to an access point of the wireless network in response to one of a plurality of access point signals, the "keep alive" signal indicating that the NIC card is wirelessly coupled to the access point,
  wherein setting the host sleep mode includes configuring the host during the sleep mode to wake up when at least one wake up command is received from the network via the access point and the NIC, and
  wherein setting the NIC power mode includes setting a main power source for the NIC to an alternate power source during the host sleep mode.

2. The method of claim 1, wherein the access point signal is one of:
  a beacon; and
  a bit indicating that the network has data available for one or more hosts.

3. A method of wirelessly controlling a network interface card (NIC) using a wireless network, the NIC providing a communication interface between a host and the wireless network, the method comprising:
  configuring the NIC to issue a wake up command to the host after the NIC receives a network command signal from the wireless network;
  receiving a wireless network signal;
  determining whether the wireless network signal is the wake up command,
    wherein if not, then returning to receiving, and
    wherein if so, then enabling a main power supply for the host and the NIC;
  receiving the network command signal;
  processing the network command signal;
  after processing the network command signal, determining if a host sleep command from the wireless network was received,
    wherein if not, then receiving an other network command signal, and
    wherein if so, then putting the host to sleep and returning to configuring the NIC.

4. The method of claim 3, wherein the other network command signal indicates that it is the last command and no further processing is required.

* * * * *